Jan. 10, 1933.    G. W. GARMAN    1,893,772
ELECTRICAL REGULATOR
Original Filed April 17, 1931

Inventor:
George W. Garman,
by Charles E. Fuller
His Attorney.

Patented Jan. 10, 1933

1,893,772

UNITED STATES PATENT OFFICE

GEORGE W. GARMAN, OF SCOTIA, NEW YORK, ASSIGNOR TO GENERAL ELECTRIC COMPANY, A CORPORATION OF NEW YORK

ELECTRICAL REGULATOR

Application filed April 17, 1931, Serial No. 530,891. Renewed September 3, 1932.

My invention relates to apparatus for regulating the operation of electrical machines or circuits and more particularly to such apparatus utilizing electric valves for effecting the desired regulation, in which moving parts or contacts are completely eliminated.

Heretofore there have been proposed various arrangements including electric valves for regulating the voltage or other electrical condition of a machine or circuit. Certain of these arrangements have the limitation that they are incapable of producing the fine degree of regulation required for stable operation of a machine or circuit under adverse conditions. Other arrangements including electric valves require the use of certain moving parts and contacts for controlling the electric valves. A regulating apparatus of this latter type is disclosed and claimed in my copending application filed April 17, 1931 (D-46,023) Serial No. 530,885, assigned to the same assignee as the present application, upon which the present invention is an improvement.

It is an object of my invention to provide an improved regulating apparatus utilizing electric valves, which is simple and reliable in operation, and in which there are no moving parts or contacts.

It is a further object of my invention to provide an improved regulating apparatus including electric valves in which very close regulation may be obtained over wide variations in the electrical condition of the machine or circuit which is being regulated.

In accordance with one embodiment of my invention the field winding of a dynamo-electric machine is energized from an alternating current circuit through a full wave rectifier including a pair of electric valves. An electrical condition, for example the potential, of the machine is maintained substantially constant by varying the phase relation between the grid and anode potentials of the electric valves in accordance with variations in the electrical condition of the machine. The grid potentials of variable phase are derived from an impedance phase shifting circuit, and are controlled by a voltage responsive device energized from the terminal potential of the machine.

Figure 1:
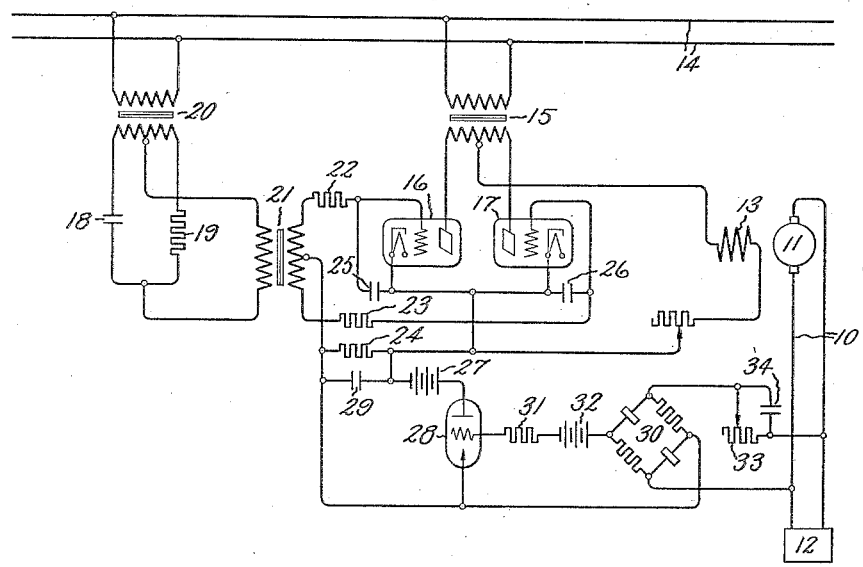

For a better understanding of my invention together with other and further objects thereof, reference is had to the following description taken in connection with the accompanying drawing, and its scope will be pointed out in the appended claims. Fig. 1 of the accompanying drawing illustrates my invention as applied to an arrangement for maintaining constant the potential of a direct current generator, while Fig. 2 illustrates a modification of the arrangement for shifting the phase of the grid potentials with respect to the anode potentials of the electric valves.

Referring more particularly to Fig. 1, I have illustrated an arrangement for controlling the potential of a direct current circuit 10 energized from a direct current generator 11 and adapted to supply a load device or circuit 12. The machine 11 is provided with a field winding 13 which is energized from an alternating current circuit 14 through a full wave rectifier comprising a transformer 15 and electric valves 16 and 17. The electric valves 16 and 17 are each provided with an anode, a cathode, and a control grid, and may be of any of the several types well known in the art, but I prefer to use valves of the vapor electric discharge type in which the starting of current in a valve is determined by the potential on its control grid but in which current flowing through the valve may be interrupted only by reducing its anode potential below the critical value. In order to control the output of the rectifier arrangement, I have provided a phase shifting circuit comprising a capacitor 18 and a resistor 19 serially connected across the secondary winding of a transformer 20, the primary winding of which is connected to the alternating current circuit 14. The primary winding of a grid transformer 21 is connected between the electrical midpoint of a secondary winding of transformer 20 and the junction between capacitor 18 and resistor 19. The control grids of electric valves 16 and 17 are connected to the outer terminals of the secondary winding of grid transformer 21 through resistors 22 and 23 respectively, while the common cathode connection of these two valves is connected to the electrical midpoint of the secondary winding of grid transformer 21 through a resistor 24. In certain cases it may be desirable to connect small capacitors 25 and 26 between the grid and cathode of the valves 16 and 17 respectively. The bias resistor 24 is included in a circuit comprising a bias battery 27 and an electric valve 28. The valve 28 is preferably of the three electrode high vacuum pure electron discharge type. A smoothing capacitor 29 is preferably connected in parallel to the bias resistor 24. The grid circuit of electric valve 28 is energized across a diagonal of a voltage responsive bridge 30 through a resistor 31 and a battery 32 while the other diagonal of this bridge is connected across the circuit 10 through an adjustable resistor 33 which may be shunted by a capacitor 34. The potential responsive bridge 30 may be of any of the several types well known in the art in which one pair of opposite arms is made up of a pair of resistors having substantially zero current-resistance characteristics, while one or both of the other arms of the bridge are made up of resistor elements having highly positive current-resistance characteristics, such as ballast lamps, or blocks of a resistance material having a non-linear voltage-resistance characteristic similar to that disclosed and claimed in a copending application of K. B. McEachron, Serial No. 198,512, filed June 15, 1927, and assigned to the same assignee as the present application.

In explaining the operation of the above described apparatus, it will be assumed that initially the potential of the direct current circuit 10 and of the machine 11 is normal. Under these conditions the potential responsive bridge 30 will be slightly unbalanced in such a direction as to impress a small positive potential upon the control grid of electric valve 28. The battery 27 will send a current through the plate circuit of the valve 28 depending upon the magnitude of its positive grid potential and this current flowing through the resistor 24 will produce a potential drop which is of such a polarity as to impress a positive potential upon the control grids of electric valves 16 and 17 through the opposite halves of the secondary winding of grid transformer 21. At the same time an alternating potential is applied to these grid circuits from the grid transformer 21. This potential is derived from the phase shifting circuit comprising capacitor 18 and resistor 19 and lags the anode potentials of electric valves 16 and 17 by approximately 90 degrees. With no negative bias supplied by the resistor 24, the output of the rectifier arrangement including valves 16 and 17 would be substantially zero when the grid potentials of these valves lag the anode potentials by approximately 90 degrees since the load on the rectifier comprising the field winding 13 is highly inductive. However, as a positive bias is supplied by resistor 24, the effect is equivalent to advancing the phase of the grid potentials of electric valves 16 and 17. That is these potentials reverse polarity at an earlier point in the half cycle of the positive half cycles of anode potential. With normal potential obtaining on the direct current circuit 10, it will be assumed the positive bias supplied by the resistor 24 is of a proper value to excite the grids of valves 16 and 17 so as to maintain a proper excitation of the machine 11. Should the potential of the circuit 10 tend to drop due to an increase in the load on this circuit, or for any other cause, the connections are such that the bridge 30 becomes more unbalanced and a higher positive potential is applied to the grid of the valve 28. The valve 28 is now more conductive and the current through it increases, at the same time producing a higher bias potential across the resistor 24 to advance the excitation of the valves 15 and 16. The average output of the rectifier arrangement is thus increased and with it the excitation of the field winding 13 of the machine 11 to bring the potential of the circuit 10 back to normal. Obviously with a decrease in the potential of the circuit 10 the reverse operation would take place. By properly adjusting the variable resistor 33, the above described apparatus can be set to maintain constant the potential of the circuit 10 over a wide range of potential. It will be obvious to those skilled in the art that the above described regulating apparatus is equally applicable to an alternating current machine or circuit in which case the circuit 14 may be connected directly to the machine, it only being necessary that some rectifying means be inserted between the circuit 10 and the control grid of electric valve 28.

Figure 2:
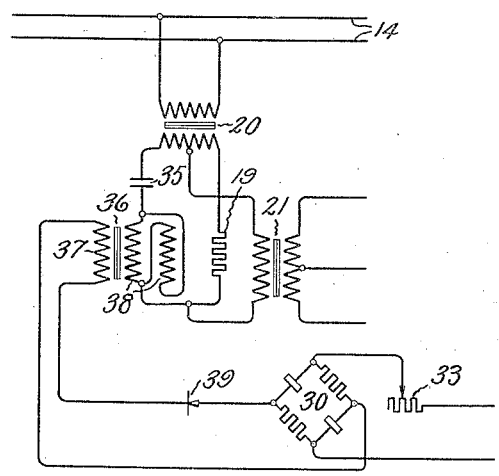

Referring now to Fig. 2 there is illustrated a modification of the phase shifting circuit illustrated in Fig. 1. In this arrangement the capacitor 18 of the phase shifting circuit of Fig. 1 is replaced by a capacitor 35 and a saturable reactor 36 provided with a saturating winding 37 and a pair of alternating current impedance windings 38 oppositely connected to prevent the inducing of an alternating potential in the direct current circuit as is well understood by those skilled in the art. In this arrangement, the saturating winding 37 is adapted to be energized directly across the normally unbalanced potential responsive bridge 30 through a unilaterally conductive device, such as a contact rectifier 39, which prevents an overshooting of the apparatus in case the voltage of the circuit 10 should change to such an extent that the bridge 30 would become unbalanced in an opposite sense. The operation of this modification will be clearly understood in view of the explanation of the operation of the apparatus in Fig. 1. Briefly the balance of the bridge 30 varies with variations of the potential of the circuit 10 and acts to vary the excitation of the saturating winding 37 to shift the phase of the grid potentials of the valves 16 and 17 in such a direction as to apply a corrective effect to the excitation of the machine 11 and thus restore the potential of the circuit 10 to normal.

While I have described what I at present consider the preferred embodiment of my invention, it will be obvious to those skilled in the art that various changes and modifications may be made without departing from my invention and I therefore aim in the appended claims to cover all such changes and modifications as fall within the true spirit and scope of my invention.

What I claim as new and desire to protect by Letters Patent of the United States is:—

1. In combination, a dynamo-electric machine provided with a field winding, an alternating current circuit, means for energizing said winding from said circuit including an electric valve provided with a control grid, an impedance phase shifting circuit, connections for exciting said control grid from said phase shifting circuit, and a potential responsive bridge for varying the excitation of said control grid.

2. In combination, a dynamo-electric machine provided with a field winding, an alternating current circuit, means for energizing said winding from said circuit including an electric valve provided with a control grid, an impedance phase shifting circuit, connections for exciting said control grid from said phase shifting circuit, a potential responsive bridge having one diagonal energized across said machine, and means for modifying the excitation furnished by said phase shifting circuit in accordance with the unbalance of said bridge.

3. In combination, a dynamo-electric machine provided with a field winding, an alternating current circuit, means for energizing said winding from said circuit including an electric valve provided with a control grid, an impedance phase shifting circuit, a circuit connecting the grid and cathode of said valve and including a potential derived from said phase shifting circuit and a resistor, a potential repsonsive bridge energized from said machine, and a circuit for producing a potential drop across said resistor varying in accordance with the unbalance of said bridge.

4. In combination, a dynamo-electric machine provided with a field winding, an alternating current circuit, means for energizing said winding from said circuit including an electric valve provided with a control grid, an impedance phase shifting circuit, a circuit connecting the grid and cathode of said valve and including a potential derived from said phase shifting circuit and a resistor, a second circuit also including said resistor, a source of direct current and a second electric valve provided with a control grid, a potential responsive bridge energized from said machine, and a circuit for energizing the grid of said second valve in accordance with the unbalance potential of said bridge.

5. In combination, a dynamo-electric machine provided with a field winding, an alternating current circuit, means for energizing said winding from said circuit including an electric valve provided with a control grid, an impedance phase shifting circuit including a reactor provided with a saturating winding, connections for exciting said control grid from said phase shifting circuit, a potential responsive bridge energized across said machine, and a circuit for energizing said saturating winding in accordance with the unbalance of said bridge.

In witness whereof, I have hereunto set my hand.

GEORGE W. GARMAN.